(12) United States Patent
Gwon et al.

(10) Patent No.: US 10,203,237 B2
(45) Date of Patent: Feb. 12, 2019

(54) MODULE APPARATUS FOR GARBAGE COLLECTION AND OPERATION METHOD FOR MODULE APPARATUS

(71) Applicant: ECUBE LABS CO., LTD., Seoul (KR)

(72) Inventors: Sun Beom Gwon, Seoul (KR); Gil Rok Do, Gunsan-si (KR)

(73) Assignee: Ecube Labs Co., LTD., Seoul (KR)

( * ) Notice: Subject to any disclaimer, the term of this patent is extended or adjusted under 35 U.S.C. 154(b) by 0 days.

(21) Appl. No.: 15/306,318

(22) PCT Filed: May 1, 2014

(86) PCT No.: PCT/KR2014/003908
§ 371 (c)(1),
(2) Date: Oct. 24, 2016

(87) PCT Pub. No.: WO2015/163525
PCT Pub. Date: Oct. 29, 2015

(65) Prior Publication Data
US 2017/0052052 A1 Feb. 23, 2017

(30) Foreign Application Priority Data
Apr. 24, 2014 (KR) .................. 10-2014-0049332

(51) Int. Cl.
*G01F 22/00* (2006.01)
*B65F 1/14* (2006.01)
(Continued)

(52) U.S. Cl.
CPC .............. *G01F 22/00* (2013.01); *B65F 1/14* (2013.01); *B65F 1/1473* (2013.01); *B65F 1/16* (2013.01);
(Continued)

(58) Field of Classification Search
CPC .. G01F 17/00; G01F 25/0061; G01F 25/0084; B65F 2210/144; B65F 2210/168; B65F 2210/117
(Continued)

(56) References Cited

U.S. PATENT DOCUMENTS 5,827,943 A * 10/1998 Schmidt ................ G01F 23/284
73/1.73
7,385,374 B2 * 6/2008 Frantz ..................... H02J 7/0022
307/43
(Continued)

FOREIGN PATENT DOCUMENTS

KR   10-2004-0052033 A   6/2004
KR   10-2006-0057724 A   5/2006
(Continued)

OTHER PUBLICATIONS

English machine translations for documents KR10-1162528, KR 1020060057724 and KR 1020110101608.*
(Continued)

*Primary Examiner* — Peter J Macchiarolo
*Assistant Examiner* — Anthony W Megna Fuentes
(74) *Attorney, Agent, or Firm* — TaeSoo Sean Kim; Nixon Peabody LLP

(57) ABSTRACT

Disclosed are a module apparatus for garbage collection and an operation method for the module apparatus. A module apparatus for garbage collection, according to the present invention, comprises: a case which is provided so as to be attached to a garbage receptacle and has a first hole on the lower end; an integrated circuit module which is accommodated inside the case; a battery for supplying power to the integrated circuit module; and a sensor unit which is electrically connected to the integrated circuit module and is for sensing the volume of garbage accumulated inside the
(Continued)

garbage receptacle, wherein the first hole is aligned with a second hole formed on the garbage receptacle and the detection unit detects the volume of the garbage through the first and second holes.

11 Claims, 9 Drawing Sheets

(51) Int. Cl.
  *G01F 15/06* (2006.01)
  *G01F 17/00* (2006.01)
  *B65G 1/16* (2006.01)
  *G01F 25/00* (2006.01)
  *B65F 1/16* (2006.01)
(52) U.S. Cl.
  CPC ............ *G01F 15/068* (2013.01); *G01F 17/00* (2013.01); *G01F 25/0084* (2013.01); *B65F 2210/128* (2013.01); *B65F 2210/1443* (2013.01); *B65F 2210/168* (2013.01); *B65F 2210/17* (2013.01); *B65F 2210/172* (2013.01); *B65F 2210/182* (2013.01); *B65F 2210/20* (2013.01)

(58) Field of Classification Search
  USPC ............................. 340/686.1, 539.23, 539.26
  See application file for complete search history.

(56) References Cited

U.S. PATENT DOCUMENTS

2004/0169494 A1    9/2004  Kim et al.
2014/0084849 A1*   3/2014  Lee .................. H02J 7/007
                                              320/107

FOREIGN PATENT DOCUMENTS

| KR | 10-2011-0101608 A | 9/2011 | |
|----|-------------------|--------|--|
| KR | 10-1162528 B1 | 7/2012 | |
| KR | 10-1173461 B1 | 8/2012 | |
| WO | WO 9943580 A1 * | 9/1999 | ............. A62C 2/241 |

OTHER PUBLICATIONS

International Search Report for PCT/KR2014/003908 dated Jan. 26, 2015 from Korean Intellectual Property Office.

\* cited by examiner

MODULE APPARATUS FOR GARBAGE COLLECTION AND OPERATION METHOD FOR MODULE APPARATUS

CROSS REFERENCE TO PRIOR APPLICATIONS

This application is a National Stage Patent Application of PCT International Patent Application No. PCT/KR2014/003908 (filed on May 1, 2014) under 35 U.S.C. § 371, which claims priority to Korean Patent Application No. 10-2014-0049332 (filed on Apr. 24, 2014), which are all hereby incorporated by reference in their entirety.

TECHNICAL FIELD

The present description relates to a module apparatus for garbage collection, and more particularly to a detachable module apparatus for garbage collection and an operation method thereof, in which the module apparatus for garbage collection may be attached to a garbage receptacle to sense the volume of garbage in the garbage receptacle.

BACKGROUND ART

Generally, garbage or recyclable material is placed in garbage receptacles installed on the wayside, in public places, in residential areas, or the like.

Such garbage should be collected properly at a right time. To this end, garbage was previously handled via garbage collection on a regular basis or when garbage receptacles are filled with garbage. However, such regular garbage collection has drawbacks in that: garbage may be collected even when garbage receptacles are not yet filled, such that a higher cost than necessary may be incurred from maintenance related to garbage collection; by contrast, even when garbage receptacles are already filled, garbage may not be collected due to a garbage collection schedule, such that garbage may be spilled out of garbage receptacles, thereby spoiling the appearance of the environment.

Accordingly, in order to reduce the garbage handling cost, a method is required which may maximize garbage collection efficiency to reduce the cost. Two matters should be mainly considered to increase garbage collection efficiency and to reduce the cost. First is the "efficiency in garbage collection time", indicating at which volume garbage is collected; and second is the "efficiency in loading of garbage", indicating how much garbage can be placed in a garbage receptacle.

A related art discloses a garbage receptacle, in which in an effort to increase collection efficiency, garbage is compressed by a compression apparatus, and when a garbage receptacle is filled above a certain level, a signal for garbage collection is transmitted remotely to a control center. However, the related art has a problem in that it is required to replace existing garbage receptacles with new ones.

DISCLOSURE

Technical Problem

A technical object of the present invention is to provide a module apparatus for garbage collection and an operation method thereof, in which the module apparatus for garbage collection is attached to a garbage receptacle to sense the volume of garbage in the garbage receptacle and transmit the sensed information to a server, thereby improving garbage collection efficiency.

A technical object of the present invention is to provide a module apparatus for garbage collection and an operation method thereof, in which the module apparatus for garbage collection may be attachable to and detachable from an existing garbage receptacle, such that the cost of replacing garbage receptacles may be reduced, and the efficiency in garbage collection may be improved.

Technical Solution

In one general aspect, the present invention provides a module apparatus for garbage collection, the apparatus including: a case which is attached to a garbage receptacle, and has a first hole on the bottom; an integrated circuit module which is accommodated in the case; a battery configured to supply power to the integrated circuit module; and a sensor unit which is electrically connected to the integrated circuit module and is configured to sense a volume of garbage accumulated in the garbage receptacle.

The first hole may be aligned with a second hole formed on the garbage receptacle, and the sensor unit may sense the volume of garbage via the first hole and the second hole.

The module apparatus for garbage collection may further include a solar cell which converts light energy or heat energy of solar light to electric energy, and charges the battery by using the electric energy.

The sensor unit may include an ultrasonic wave sensor which transmits ultrasonic waves into the inside of the garbage receptacle via the first hole and the second hole, and may measure the height of the garbage by receiving reflected ultrasonic waves.

At the initial state before the garbage is accumulated in the garbage receptacle, the ultrasonic wave sensor may measure a minimum reference value based on a first time taken for the ultrasonic waves to be reflected and received.

The case may further include a third hole on the bottom, and the module apparatus for garbage collection may further include an environment sensor which is electrically connected to the integrated circuit module, and senses flame, smoke, or temperature in the garbage receptacle via the third hole to detect whether fire breaks out.

The module apparatus for garbage collection may further include a communication unit configured to wirelessly transmit information, sensed by the sensor unit, to a remote server.

The communication server may include: a first-type communication module configured to communicate with the server; and a second-type communication module configured to communicate with other module apparatus for garbage collection.

In another general aspect, the present invention provides an operation method of a module apparatus for garbage collection which communicates with a server via a communication network and is attachable to a garbage receptacle, the method including: attaching the module apparatus for garbage collection to a surface of the garbage receptacle so that a first hole formed at the module apparatus for garbage collection is aligned with a second hole formed at the garbage receptacle; sensing a volume of garbage accumulated in the garbage receptacle via the first hole and the second hole; and transmitting the sensed information to the server via a wireless communication network.

The sensing of the volume of garbage may include: transmitting ultrasonic waves into the inside of the garbage receptacle, and measuring a first time taken for the ultrasonic waves to be reflected from an object and returned; and calculating the height of the garbage based on the time.

Advantageous Effects

According to embodiments of the present invention, the module apparatus for garbage collection may be attached to an existing garbage receptacle to sense and transmit the volume of garbage in the garbage receptacle, thereby improving the garbage collection efficiency, and reducing the cost of garbage collection.

Further, according to embodiments of the present invention, the module apparatus for garbage collection may be simply attached in a module form to an existing garbage receptacle, such that there is no need to replace the existing garbage receptacle, and a garbage collection network may be established at a low cost.

BRIEF DESCRIPTION OF THE DRAWINGS

In order to more fully understand the drawings referred to in the detailed description of the present invention, a brief description of each drawing is presented, in which.

BEST MODE

Figure 1:
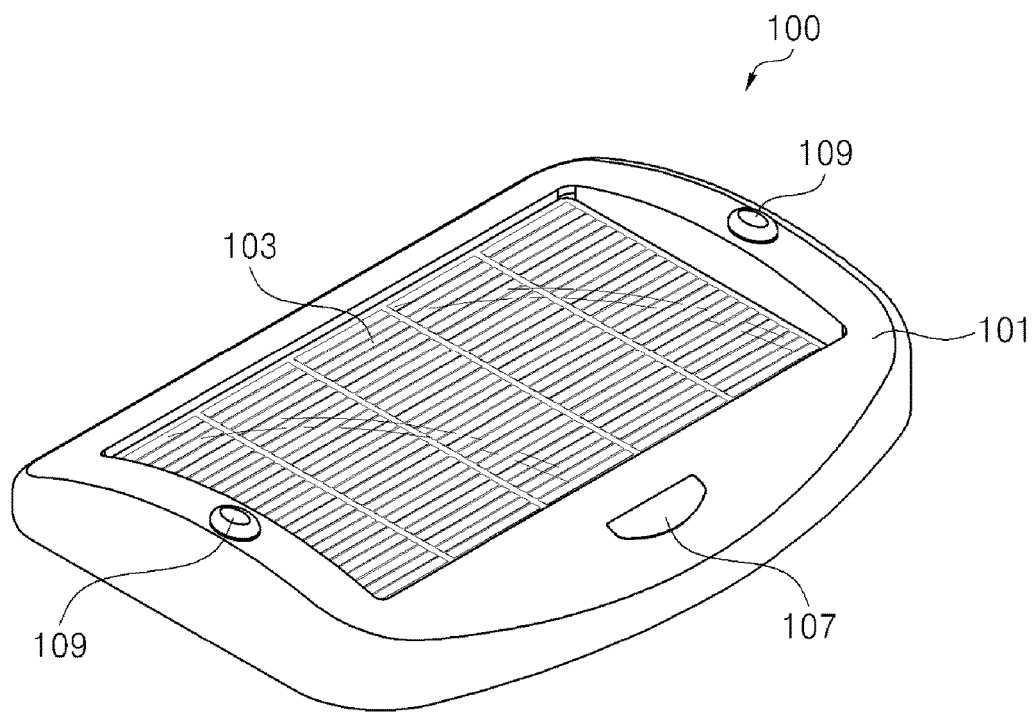
FIG. 1 is an example of a perspective view of a module apparatus for garbage collection according to an exemplary embodiment of the present invention.

Any structural or functional description specified for embodiments in accordance with the concept of the present invention disclosed in the present specification is simply provided for description of the embodiments in accordance with the concept of the present invention, and it shall be appreciated that the embodiments in accordance with the concept of the present invention may be embodied in various forms and may not be limited to the embodiments described herein.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between. Other expressions describing relations between the elements, for example, "between" and "directly between" or "adjacent" and "directly adjacent," shall be interpreted in the same fashion.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical and scientific terms, used herein may be used with meanings commonly understood by a person having ordinary knowledge in the art to which the present invention pertains. Any term that is defined in a generally-used dictionary shall be construed to have the same meaning in the context of the relevant art, and, unless otherwise defined explicitly, shall not be interpreted to have an idealistic or excessively formalistic meaning.

Hereinafter, the exemplary embodiments of the present invention will be described in detail with reference to the accompanying drawings.

Figure 2:
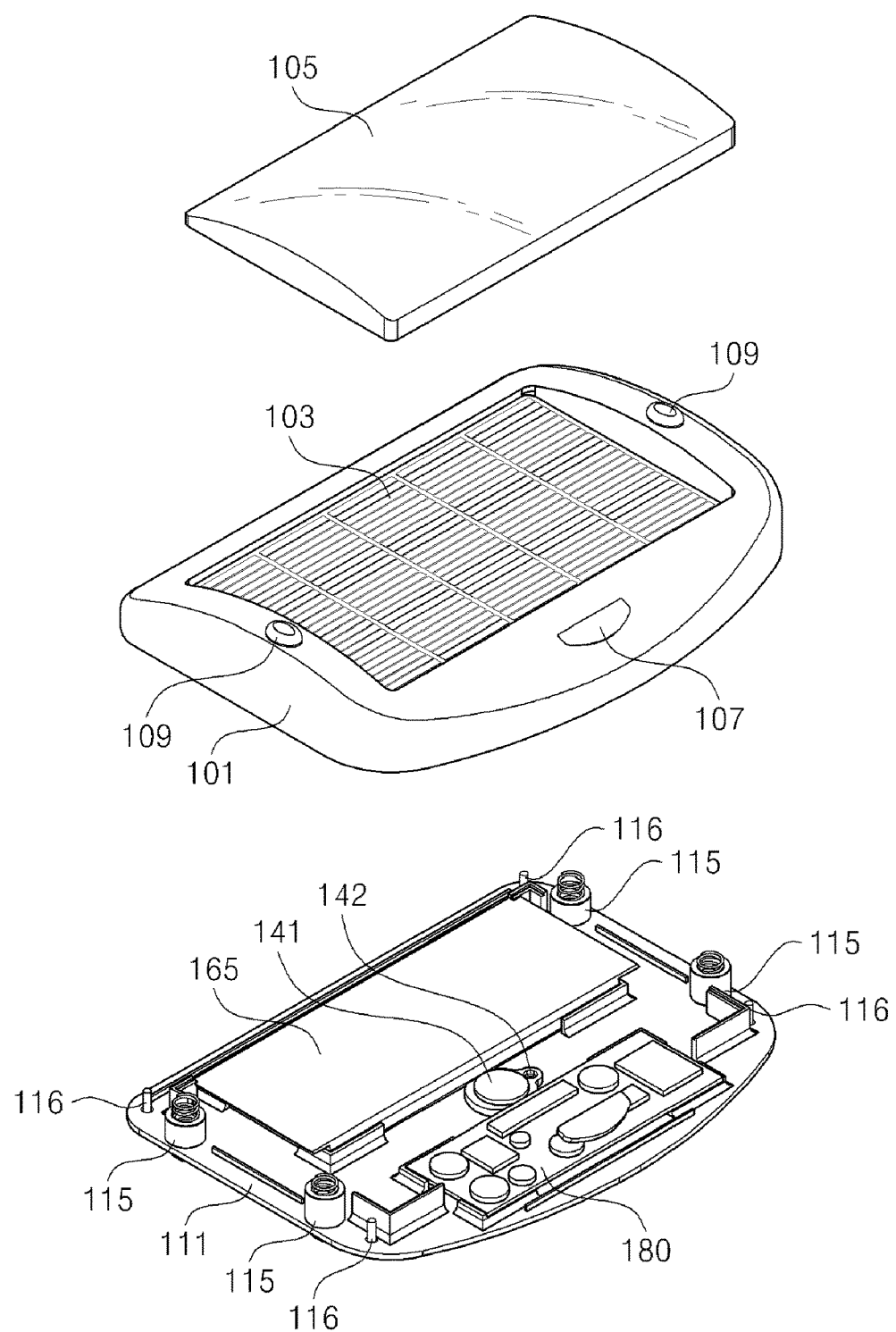
FIG. 2 is a partially exploded perspective view illustrating the inside of a module apparatus for garbage collection according to an exemplary embodiment of the present invention.
Figure 3:
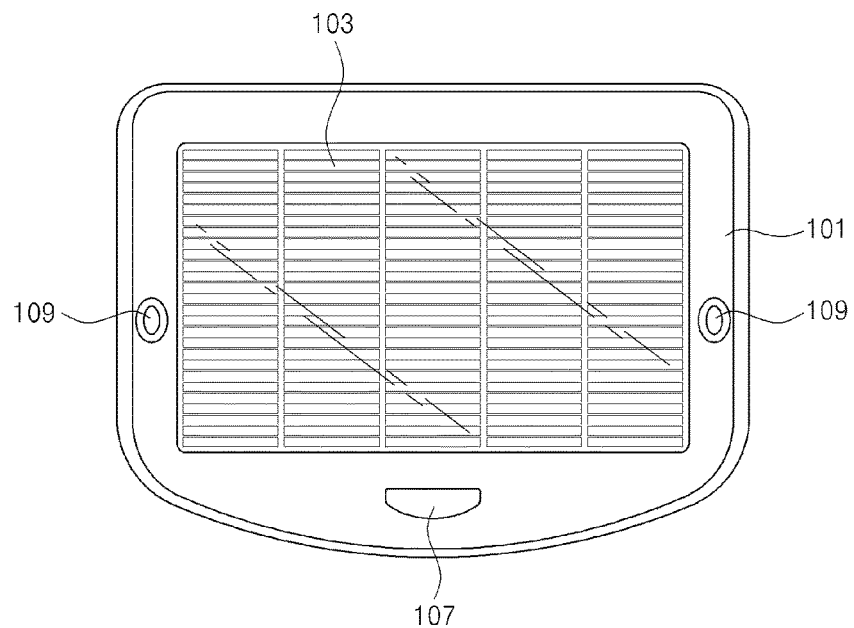
FIG. 3 is a cross-sectional view seen from the upper side of a module apparatus for garbage collection according to an exemplary embodiment of the present invention.
Figure 4:
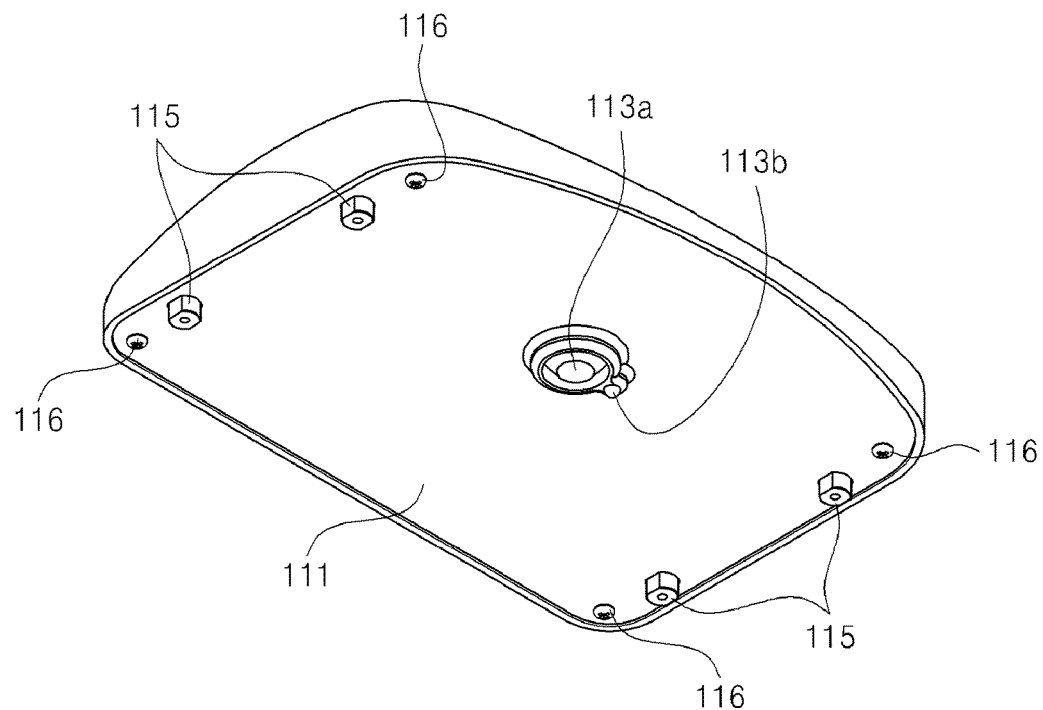
FIG. 4 is another example of a perspective view of a module apparatus for garbage collection according to an exemplary embodiment of the present invention.
Figure 5:
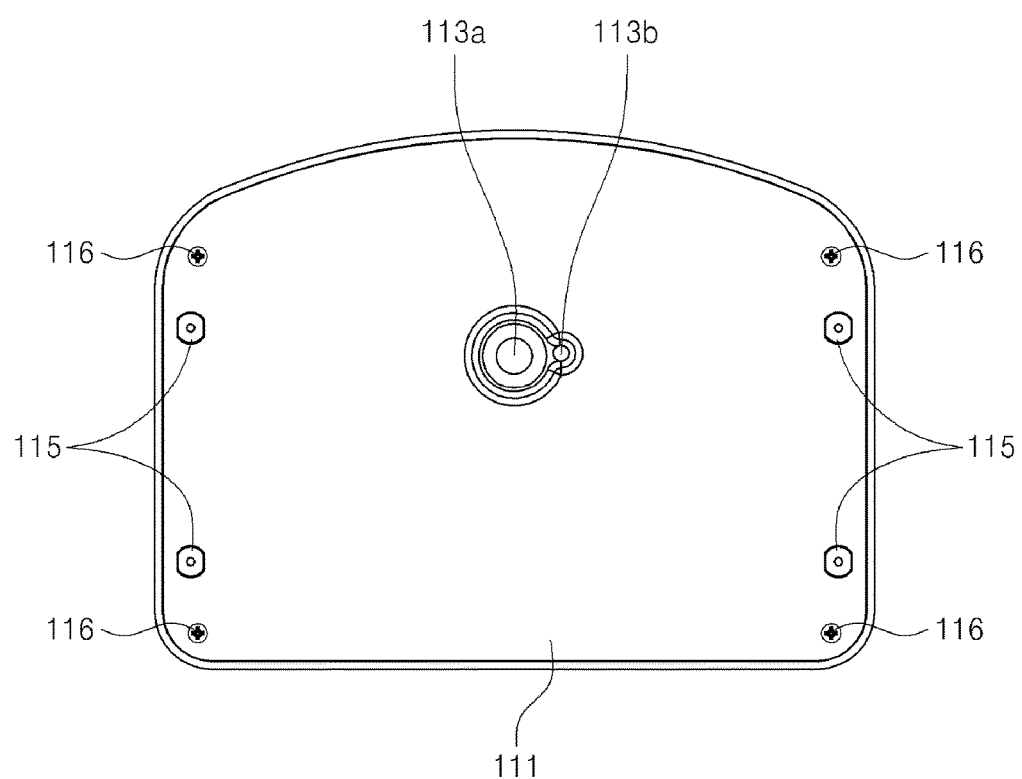
FIG. 5 is a cross-sectional view seen from the lower side of a module apparatus for garbage collection according to an exemplary embodiment of the present invention.

FIG. 1 is an example of a perspective view of a module apparatus 100 for garbage collection according to an exemplary embodiment of the present invention. FIG. 2 is a partially exploded perspective view illustrating the inside of a module apparatus for garbage collection according to an exemplary embodiment of the present invention. FIG. 3 is a cross-sectional view seen from the upper side of a module apparatus for garbage collection according to an exemplary embodiment of the present invention. FIG. 4 is another example of a perspective view of a module apparatus for garbage collection according to an exemplary embodiment of the present invention. FIG. 5 is a cross-sectional view seen from the lower side of a module apparatus for garbage collection according to an exemplary embodiment of the present invention.

Figure 7:
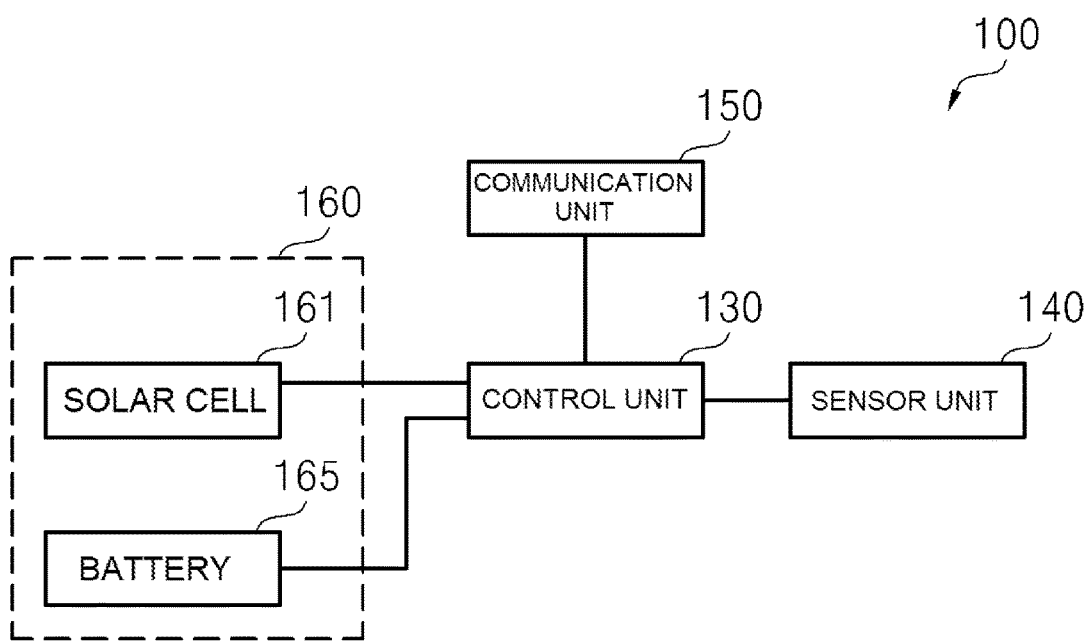
FIG. 7 is a schematic block view illustrating a module apparatus for garbage collection according to an exemplary embodiment of the present invention.
Figure 8:
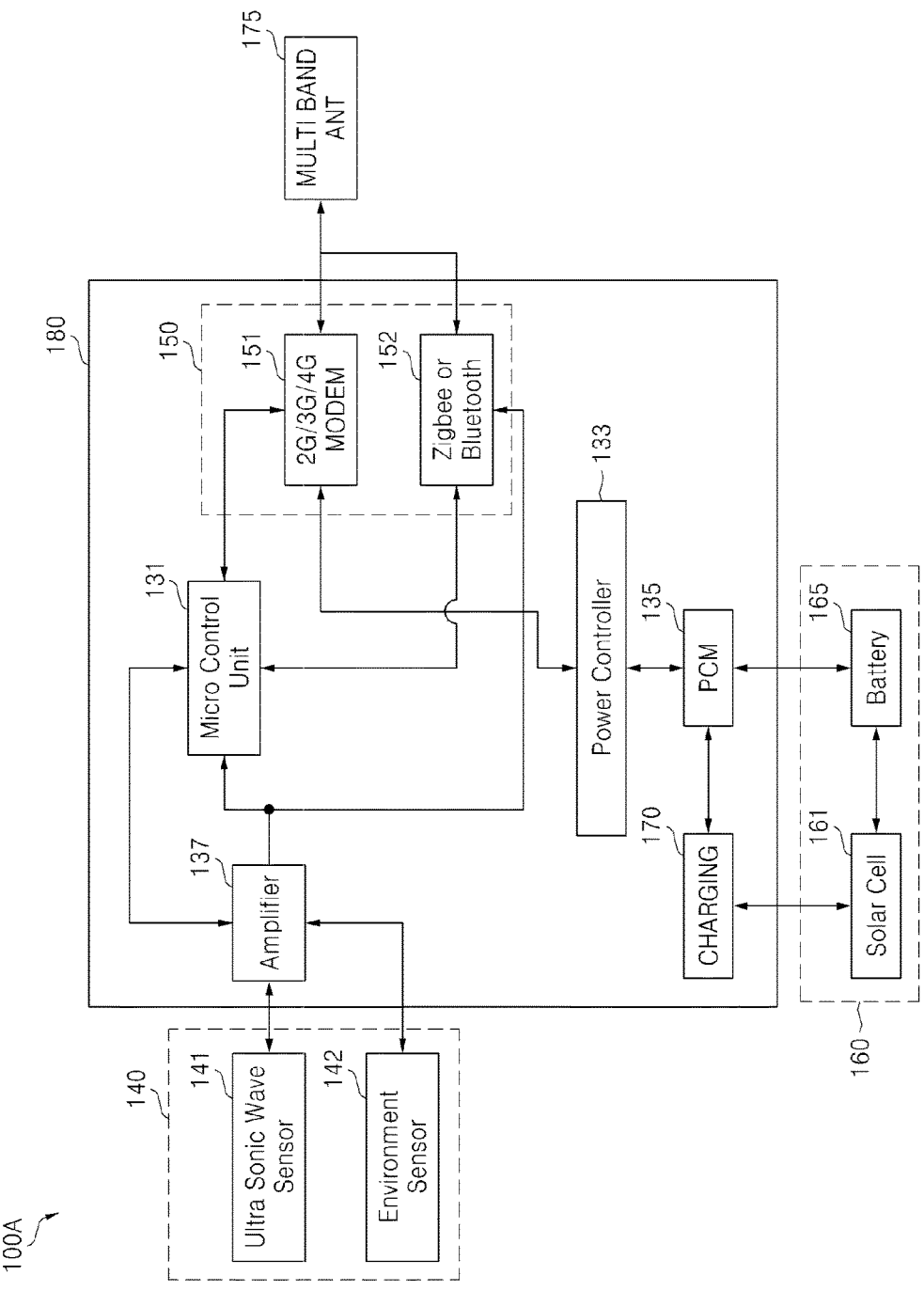
FIG. 8 is a block view illustrating in more detail a module apparatus for garbage collection according to an exemplary embodiment of the present invention.

Referring to FIGS. 1 to 5, the module apparatus 100 for garbage collection includes a case, an integrated circuit module 180, a solar cell panel 103, a display 107, a battery 165, and a sensor unit 140 (see FIGS. 7 and 8).

Figure 6:
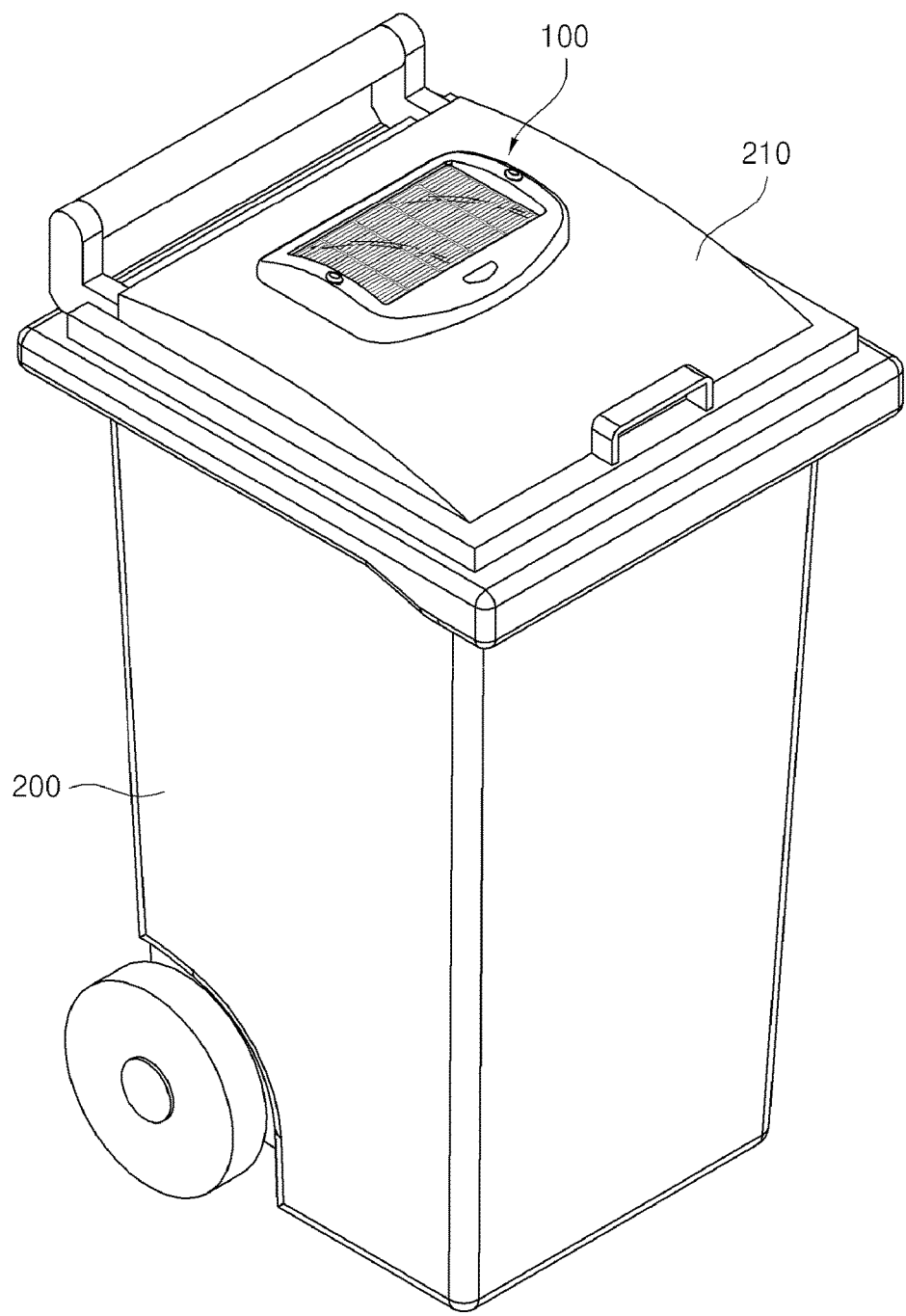
FIG. 6 is a view illustrating a module apparatus for garbage collection attached to an existing garbage receptacle, according to an exemplary embodiment of the present invention.

The case may be attached to a lid 210 (see FIG. 6) of a garbage receptacle 200 (see FIG. 6).

The integrated circuit module 180, the battery 165, and the sensor unit 140 may be accommodated in the case.

A lower surface of the case, which contacts the lid 210 of the garbage receptacle 200, may have at least one hole 113a and 113b.

The case may be configured to include one or more partial cases.

In the exemplary embodiment of the present invention, the case includes a main case 101, an upper case 105, and a lower case 111. However, the present invention is not limited thereto, and the number and types of the case may vary. The lower case 111 has a first hole 113a and a second hole 113b. The first hole 113a and the second hole 113b are used to dispose one or more sensors 141 and 142 of the sensor unit 140, and the number and types of the holes may vary.

The solar cell panel 103 may be connected to the main case 101.

The display 107 may be connected to the main case 101. The display 107 may be electrically connected to the integrated circuit module 180. Further, a shock absorber 109 may be provided for the main case 101. The shock absorber 109 is a device to reduce shock imparted to the module apparatus 100 for garbage collection when the lid 210 of the garbage receptacle 200 is opened, thereby increasing durability of the module apparatus 100 for garbage collection.

The shock absorber 109 may be formed as a projection on an outermost side of the case, e.g., on both sides of the upper portion, and may be made of rubber material, but is not limited thereto.

In the case where the shock absorber 109 is provided, shock on a surface is transmitted as a shock on a point or a shock on a line, such that the shock may be reduced.

The main case 101 and the lower case 111 may be coupled via a case coupling portion 116. Further, the case may be attached to the garbage receptacle 200 via a garbage receptacle coupling portion 115.

The garbage receptacle coupling portion 115 may have a structure to absorb shock of an external pressure. For example, the garbage receptacle coupling portion 115 may include a hole, a spring formed at the hole, and a projection connected to the spring, in which the projection may be adapted to move in and out of the hole by the spring.

The case has an accommodating space, in which the integrated circuit module 180 and the battery 165 may be accommodated.

The sensor unit 140 is a device to sense the height of garbage accumulated in the garbage receptacle, the inner temperature, smoke, flame, and the like. To this end, the sensor unit 140 may include one or more sensors 141 and 142. The one or more sensors 141 and 142 are electrically connected to the integrated circuit module 180, and may be placed inside the garbage receptacle or toward the inside of the garbage receptacle.

The battery 165 supplies power to the integrated circuit module 180 and the sensor unit 140.

FIG. 6 is a view illustrating a module apparatus 100 for garbage collection attached to an existing garbage receptacle 200, according to an exemplary embodiment of the present invention. Referring to FIG. 6, the module apparatus 100 for garbage collection may be attached to the existing garbage receptacle 200. That is, the module apparatus 100 for garbage collection is an apparatus that is attachable to and detachable from the existing garbage receptacle.

In the exemplary embodiment, the module apparatus 100 for garbage collection may be attached to the lid 210 of the garbage receptacle 200. However, the present invention is not limited thereto, and the module apparatus 100 for garbage collection may be attached to other portions including the side, the front portion, and the like of the garbage receptacle 200. For example, the module apparatus 200 for garbage collection may be attached at an appropriate portion according to shape and form of the garbage receptacle 200.

Although not illustrated herein, one or more holes may be formed on the lid 210 of the garbage receptacle 200 (for convenience of explanation, hereinafter referred to as "garbage receptacle holes").

The garbage receptacle holes (not shown) may be aligned with the holes 113a and 113b of the module apparatus for garbage collection.

Accordingly, the holes 113a and 113b of the module apparatus for garbage collection are aligned with the garbage receptacle holes, and the one or more sensors may sense the height of garbage, temperature, smoke, flame, and the like in the garbage receptacle 200 through the holes 113a and 113b of the module apparatus for garbage collection and the garbage receptacle holes.

FIG. 7 is a schematic block view illustrating a module apparatus for garbage collection according to an exemplary embodiment of the present invention. FIG. 8 is a block view illustrating in more detail a module apparatus for garbage collection according to an exemplary embodiment of the present invention.

Referring to FIGS. 7 and 8, the module apparatus 100 for garbage collection includes a control unit 130, a sensor unit 140, a communication unit 150, and a power supply unit 160.

The control unit 130 may control the overall operation of the module apparatus 100 for garbage collection.

The sensor unit 140 includes a garbage volume sensor 141 and an environment sensor 142. The garbage volume sensor 141 senses the accumulated volume (i.e., height) of garbage in the garbage receptacle. The sensed signal is transmitted to an external server 30 (see FIGS. 9-11), and a manager managing the server handles the transmitted signal.

The garbage volume sensor 141 may be an ultrasonic wave sensor or an infrared sensor, but is not limited thereto.

In the case where the garbage volume sensor 141 is an ultrasonic wave sensor, the garbage volume sensor 141 transmits ultrasonic waves into the garbage receptacle, receives ultrasonic waves reflected from an object (garbage receptacle or the bottom of the garbage receptacle), and measures a delay time taken for the reflected ultrasonic waves to return. In this manner, the garbage volume sensor 141 may measure the distance to the object, and may detect the accumulated garbage amount (i.e., height) based on the measured distance.

In order to calculate a starting point when the module apparatus 100 for garbage collection is first installed, the ultrasonic wave sensor 141 takes the measurement when the garbage receptacle is emptied, so as to calculate a minimum reference value. The minimum reference value may refer to the height when the garbage receptacle is emptied.

Further, the ultrasonic wave sensor 141 may calculate a maximum reference value by assuming that the garbage receptacle is filled to a maximum level. For example, while a blind patch is arranged on a lower portion of the ultrasonic wave sensor 141, the ultrasonic wave sensor 141 measures the inside of the garbage receptacle to calculate the maximum reference value. In another example, at least either one of the minimum reference value and the maximum reference value may be predetermined according to the height of the garbage receptacle 200 to which the module apparatus 100 for garbage collection is to be attached.

When detecting the accumulated garbage volume (i.e. height), the ultrasonic wave sensor 141 may calibrate the detected height by using the minimum reference value and the maximum reference value.

The calibration of the accumulated garbage volume (i.e., height) may be made by the ultrasonic wave sensor 141 or by a micro control unit 131.

In the case where the garbage volume sensor 141 is an infrared sensor, the garbage volume sensor 141 transmits infrared light to the inside of the garbage receptacle, and may measure the distance according to the sensitivity of the reflected infrared light. Based on the measured distance, the garbage volume sensor 141 may detect the garbage volume (i.e., height).

The garbage volume sensor 141 may separately include a light emitting unit, which emits ultrasonic waves or infrared light, and a light receiving unit, which receives reflected ultrasonic waves or infrared light, or may include a light emitting unit and a light receiving unit that are integrally formed.

The environment sensor 142 senses the environment of the garbage receptacle 200, and may sense fire or an abnormal state based on the sensed environment.

The environment sensor 142 may sense the case where fire breaks out due to a lit cigarette butt thrown in the garbage receptacle 200 having combustible material, or the case where fire breaks out when a butane gas tank, in which butane gas remains, is thrown in the garbage receptacle and is heated for various reasons to explode.

Upon sensing fire, smoke, or flame, or sensing temperature higher than a predetermined level, the environment sensor 142 may be adapted to sound an alarm or transmit information to the server 30 via the communication unit 150.

Here, the environment sensor 142 may be a flame sensor which senses a flame based on the frequency of flame when fire breaks out, or may be a smoke sensor which senses smoke when fire breaks out. Alternatively, the environment sensor 142 may be a temperature sensor which senses temperature when fire breaks out.

Operational principles and structures of the flame sensor, smoke sensor, and temperature sensor are well known in the art, and do not constitute the main features of the present invention, such that detailed description thereof will be omitted.

The communication unit 150 may include at least either one of a first-type communication module 151, which enables far-field wireless communication, and a second-type communication module 152, which enables near-field wireless communication. In the exemplary embodiment of FIG. 8, both of the first-type communication module 151 and the second-type communication module 152 are provided, but in another embodiment, only the first-type communication module 151 or the second-type communication module 152 may be provided.

The communication unit 150 may transmit information on the module apparatus 100 for garbage collection to the server 30 on a regular or irregular basis. The information on the module apparatus 100 for garbage collection may include information sensed by the sensor unit 140, battery charge information, location information of the module apparatus 100 for garbage collection, state information of the module apparatus 100 for garbage collection, and the like.

An antenna 175 may be electrically connected to the communication unit 150. The antenna 175 may be a multi-band antenna that may support a mobile communication frequency and a near-field wireless communication frequency.

The power supply unit 160 is a device to supply power to the control unit 130, the sensor unit 140, and the communication unit 150, and may include a rechargeable battery 165 (see FIG. 7) accommodated in a battery accommodating space 119. The rechargeable battery 165 may be charged via an external source or solar energy.

In the case where the rechargeable battery 165 is charged by using solar energy, the power supply unit 160 receives solar energy through a solar cell 161, produces electricity from the received solar energy, and uses the produced electricity to charge the rechargeable battery 165.

Here, the solar cell 161 may be adapted to use at least either one of solar light energy or solar heat energy.

The module apparatus 100 for garbage collection may also include a display 107. The display 107 may be a light emitting diode (LED) or a liquid crystal display (LCD).

The display 107 may display information on the module apparatus 100 for garbage collection by receiving power from the power supply unit 160. For example, the display 107 may include at least one LED, and may display a garbage volume at two or more levels (e.g., three levels). For example, in the case where the garbage volume is at a level equal to or lower than a first reference value, the garbage volume may be displayed in green; in the case where the garbage volume is at a level between the first reference value and a second reference value, the garbage volume is displayed in yellow; and in the case the garbage volume is at a level equal to or higher than the second reference value, the garbage volume may be displayed in red. However, the display method is merely an example, and the information on the module apparatus 100 for garbage collection may be displayed in other various manners.

Referring to FIG. 8, the integrated circuit module 180 includes a micro control unit 131, a power controller 133, a protection circuit module (PCM) 135, an amplifier 137, a communication unit 150, and a charge unit 170. The integrated circuit module 180 may further include a memory device (not shown), such as a read-only memory (ROM), Random access memory (RAM), and the like.

The micro control unit 131 may be a central processing unit (CPU), a microprocessor, or the like. The micro control unit 131 may control the overall operation of the module apparatus 100 for garbage collection.

The amplifier 137 amplifies a signal sensed by the sensor unit 140, and outputs the amplified signal.

The amplified signal may be input to the micro control unit 131 to be processed, or may be input to the communication unit 150 without passing through the micro control unit 131 and may be transmitted to an external device (e.g., the server 30 or another module apparatus 100 for garbage collection. The sensed signal may be an analog signal or a digital signal.

In the case where the sensed signal is analog signal, the amplifier 137 may be an analog amplifier.

The micro control unit 131 may receive the sensed signal, and may convert (e.g., analog-to-digital conversion) or calibrated the signal.

The communication unit 150 may include a first-type communication module 151 and a second-type communication module 152.

The first-type communication module 151 may be a communication module that may transmit and receive a signal by using 2G, 3G, and/or 4G mobile communication systems. The second-type communication module 152 may be a communication module that may transmit and receive a signal by using a near-field wireless communication system such as Zigbee and Bluetooth.

The first-type communication module 151 may perform communication with the server 30. For example, the first-type communication module 151 may transmit various types of information (e.g., state signal, sensed signal, etc.) on the module apparatus 100 for garbage collection to the server 30 via 2G/3G/4G mobile communication networks. Further, the first-type communication module 151 may receive a control signal from the server via 2G/3G/4G mobile communication networks.

The second-type communication module 151 may perform communication with other module apparatus 100 for garbage collection. For example, the second-type communication module 152 may receive information (e.g., state signal, sensed signal, etc.) on other module apparatus for garbage collection located nearby, or may transmit previously received information (e.g., state signal, sensed signal, etc.) to other module apparatus 100 located nearby.

Alternatively, the second-type communication module 152 may receive information from other module apparatus 100 for garbage collection and transmit the received information to another module apparatus 100 for garbage collection.

The charge unit 170 may rectify voltage output from the solar cell 161 and may provide the rectified voltage to the protection circuit module (PCM) 135. Accordingly, the charge unit 170 may rectify unstable voltage output from the solar cell 161, converts the unstable voltage to fairly stable voltage, and provides the stable voltage to the PCM 135.

The PCM 135 prevents overcharge or over-discharge of a battery to protect a battery, and operates under the control of the power controller 133. Upon receiving the voltage supplied by the charge unit 170, the PCM 135 provides charging current to the battery 165 to charge the battery 165. The PCM 135 may adjust the intensity of the charging current by the control of the power controller 133.

Further, the PCM 135 may detect a charge amount of the battery 165 and may provide the detected charge amount to the power controller 133.

The power controller 133 may provide the battery charge amount to the micro control unit 131. The micro control unit 131 may control an operational mode of the module apparatus 100 for garbage collection based on the battery charge amount. For example, in the case where the charge amount of the battery 165 is above a predetermined threshold, the micro control unit 131 may control the module apparatus 100 for garbage collection to operate in a normal mode; and in the case where the charge amount of the battery 165 is below the predetermined threshold, the micro control unit 131 may control the module apparatus 100 for garbage collection to operate in a low-power mode.

In the normal mode, the sensor unit 140 normally performs sensing and transmits the sensed signals to the server 30 via the communication unit 150.

By contrast, in the low-power mode, the sensing operation of the sensor 140 and the communication operation of the communication unit 150 may be disabled.

Figure 9:
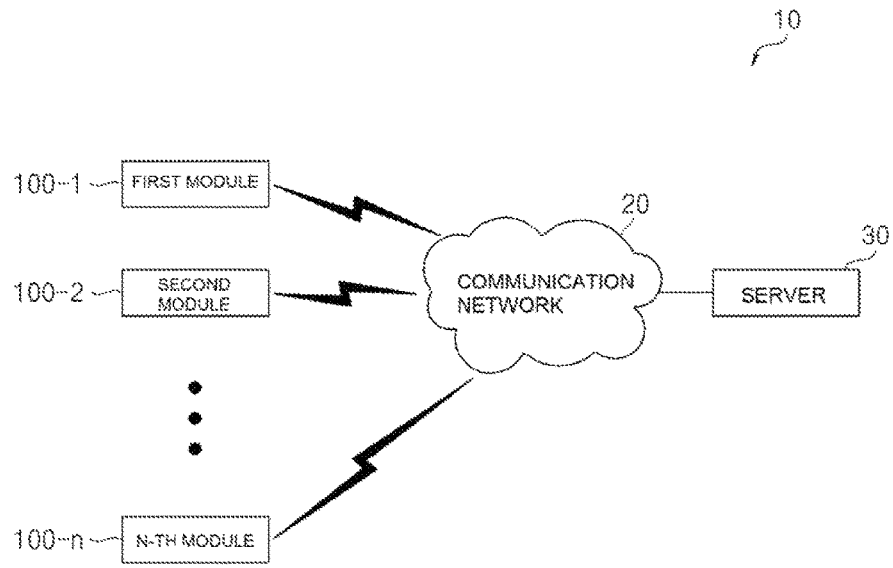
FIG. 9 is schematic block view illustrating a garbage collection system according to an exemplary embodiment of the present invention.

FIG. 9 is schematic block view illustrating a garbage collection system according to an exemplary embodiment of the present invention. Referring to FIG. 9, the garbage collection system includes a first to n-th module apparatuses 100-1 to 100-n (n is a natural number equal to or higher than 2) and a server 30. Each of the first to n-th module apparatuses 100-1 to 100-n is the module apparatus for garbage collection according to the aforementioned embodiments of the present invention, and may include the first-type communication module 151.

Each of the first to n-th module apparatuses 100-1 to 100-n transmits their own information to the server 30 via a communication network 20. The communication network 20 may be the aforementioned 2G/3G/4G mobile communication networks.

Each of the first to n-th module apparatuses 100-1 to 100-n communicates with the server 30, such that it is easy to select the location of each module apparatus, but the communication cost may be increased, and the traffic of communication carriers may also be increased.

The server 30 communicates with the first to n-th module apparatuses 100-1 to 100-n via the communication network 20, and may manage the first to n-th module apparatuses 100-1 to 100-n. The first to n-th module apparatuses 100-1 to 100-n may be registered with the server 30 at the initial time of installation to be managed by the server 30. Accordingly, a manager may access the server 30 to check or control the registered module apparatuses 100 for garbage collection. For example, the manager may check the location or information of a specific module apparatus 100 for garbage collection, and may even adjust a reference value of a garbage volume.

The server 20 may receive information from the first to n-th module apparatuses 100-1 to 100-n, and may store the received information. Further, the server 30 may calculate statistical data by using the information received from the first to n-th module apparatuses 100-1 to 100-n. The statistical data may include a summary of statistics, the number of garbage collections, collection efficiency, the collected volume of garbage, battery charge amount, failure history, and the like.

Figure 10:
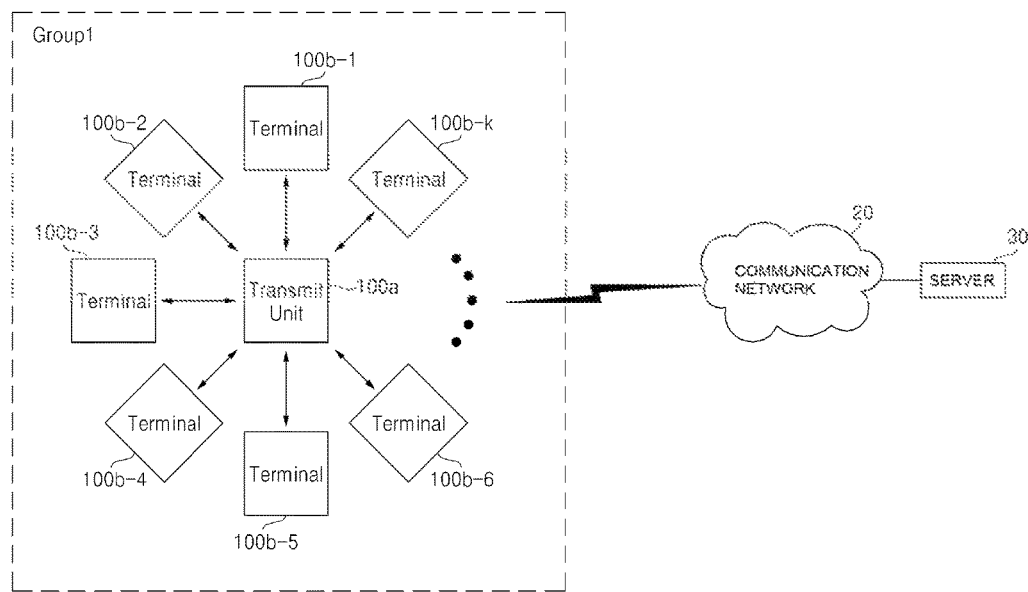
FIG. 10 is schematic block view illustrating a garbage collection system according to another exemplary embodiment of the present invention.

FIG. 10 is schematic block view illustrating a garbage collection system according to another exemplary embodiment of the present invention.

Referring to FIG. 10, the garbage collection system includes a module group 1 and a server 30. The module group 1 includes a first-type module apparatus 100a and one or more second-type module apparatuses 100b-1 to 100b-k (k is a natural number equal to or higher than 1).

The first-type module apparatus 100a may be a module apparatus for garbage collection which includes both the first-type communication module 151 and the second-type communication module 152.

Each of the one or more second-type module apparatuses 100b-1 to 100b-k may be a module apparatus for garbage collection which includes only the second-type communication module 152 without the first-type communication module 151.

Each of the one or more second-type module apparatuses 100b-1 to 100b-k transmits their own information to the first-type module apparatus 100a, and the first-type module apparatus 100a collects information of the second-type module apparatuses 100b-1 to 100b-k located nearby to transmit the collected information to the server 30 via the communication network 20.

Figure 11:
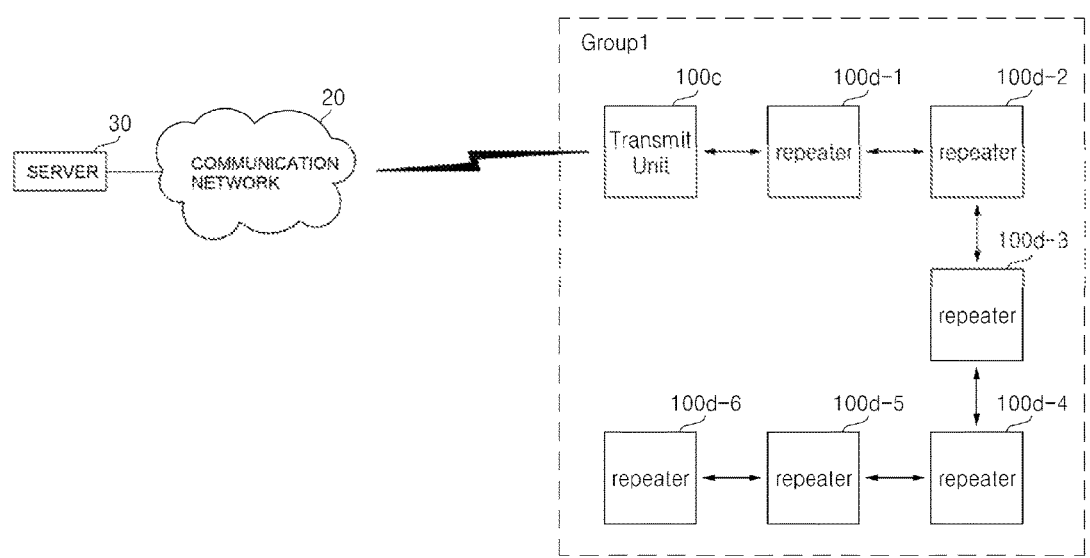
FIG. 11 is schematic block view illustrating a garbage collection system according to yet another exemplary embodiment of the present invention.

FIG. 11 is schematic block view illustrating a garbage collection system according to yet another exemplary embodiment of the present invention.

Referring to FIG. 11, the garbage collection system includes a module group 1 and a server 30. The module group 1 includes a third-type module apparatus 100c and one or more fourth-type module apparatuses 100d-1 to 100d-k (k is a natural number equal to or higher than 1).

The third-type module apparatus 100c may be a module apparatus for garbage collection which includes both the first-type communication module 151 and the second-type communication module 152.

Each of the one or more fourth-type module apparatuses 100d-1 to 100d-k may be a module apparatus for garbage collection which includes only the second-type communication module 152 without the first-type communication module 151. The second-type communication module 152 of the fourth-type module apparatuses 100d-1 to 100d-k may perform as a repeater that receives information from other module apparatus and transmits the received information to another module apparatus.

Accordingly, each of the one or more fourth-type module apparatuses 100d-1 to 100d-k transmits their own information to the third-type module apparatus 100c directly or via one or more other module apparatuses, and the third-type module apparatus 100c collects information of the fourth-type module apparatuses 100d-1 to 100d-k to transmit the collected information to the server 30 via the communication network 20.

In the exemplary embodiments of FIGS. 10 and 11, only one module apparatus (representative module apparatus) per group communicates with the server 30, while other module apparatuses transmit their information to the representative module apparatus, thereby reducing the communication cost. Further, in this manner, the production cost of a module apparatus may be reduced, the load on the server may also be reduced, and management may be performed efficiently.

The module apparatus 100 for garbage collection may detect its own location information.

The module apparatus 100 including the first-type communication unit 151 may receive signals from one or more base stations of the mobile communication network. Accordingly, the first-type communication unit may measure the strength of a signal received from the one or more base stations.

At the initial operation, the module apparatus 100 for garbage collection may receive signals from a predetermined number (e.g., three) of base stations, measure the strength of each signal, and determine the initial location of the module apparatus based on the initial signal strength and the measured strength of each signal.

Subsequently, the module apparatus 100 for garbage collection may regularly measure the strength of signals transmitted from the identical base stations, and may detect signal strength variations from the initial signal strength. In the case where the signal strength variation from the initial signal strength is equal to or higher than a predetermined value, a location change may be detected.

In the case where a location is changed beyond a certain range from the initial location, the module apparatus 100 for garbage collection transmits a location change signal to the server to notify a manager of the location change.

By detecting whether the location is changed or not, theft of the module apparatus may be prevented.

Further, the module apparatus 100 for garbage collection may further include a wireless charging module (not shown).

The wireless charging module is a device to wireless charge a cellular phone by using power from the solar cell 161 and the rechargeable battery 165. The wireless charging module may include a plate having a coil wrapped therearound and a circuit to flow an induced current to the coil.

While the present invention has been described herein with reference to the exemplary embodiments illustrated in the accompanying drawings, this disclosure is merely illustrative. Further, it will be appreciated by those skilled in the art that various modifications and other equivalent embodiments can be derived from the exemplary embodiments of the present invention. Therefore, the scope of true technical protection of the present invention should be defined by the technical idea of the appended claims.

INDUSTRIAL APPLICABILITY

The present invention relates to a module apparatus for garbage collection and an operation method thereof, in which the module apparatus for garbage collection is attachable to a garbage receptacle, and may be used in applications related to garbage collection.

The invention claimed is:

1. A module apparatus for garbage collection, the apparatus comprising:
   a case which is attached to a garbage receptacle, and has a first hole on the bottom;
   an integrated circuit module which is accommodated in the case;
   a battery configured to supply power to the integrated circuit module;
   a sensor unit which is electrically connected to the integrated circuit module and is configured to sense a volume of garbage accumulated in the garbage receptacle, wherein:
      the first hole is aligned with a second hole formed on the garbage receptacle; and
      the sensor unit senses the volume of garbage via the first hole and the second hole which are aligned; and
   a communication unit configured to wirelessly transmit information sensed by the sensor unit to a remote server, wherein the communication unit is further configured to:
      determine an initial signal strength by measuring strength of signals received from each of two or more base stations at an initial operation; and
      determine a signal strength variation from the initial signal strength by measuring the strength of the signals received from each of the two or more base stations after the initial operation,
   wherein the module apparatus for garbage collection detects a location change of the module apparatus based on the determined variation.

2. The apparatus of claim 1, wherein the module apparatus for garbage collection further comprises a solar cell which converts light energy or heat energy of solar light to electric energy, and charges the battery by using the electric energy.

3. The apparatus of claim 1, wherein:
   the sensor unit comprises an ultrasonic wave sensor which transmits ultrasonic waves into the inside of the garbage receptacle via the first hole and the second hole, and measures the height of the garbage by receiving reflected ultrasonic waves,
   wherein at the initial state before the garbage is accumulated in the garbage receptacle, the ultrasonic wave sensor measures a minimum reference value based on a first time taken for the ultrasonic waves to be reflected and received.

4. The apparatus of claim 1, wherein:
the case further comprises a third hole on the bottom; and
the module apparatus for garbage collection further comprises an environment sensor which is electrically connected to the integrated circuit module, and senses flame, smoke, or temperature in the garbage receptacle via the third hole to detect whether fire breaks out.

5. The apparatus of claim 1, wherein the communication unit comprises: a first-type communication module configured to communicate with the server; and a second-type communication module configured to communicate with other module apparatus for garbage collection.

6. The apparatus of claim 1, wherein the integrated circuit module comprises a protection circuit module (PCM) configured to prevent overcharge or over-discharge of the battery by adjusting a charging current supplied to the battery, and detect a charge amount of the battery.

7. The apparatus of claim 6, wherein the integrated circuit module further comprises a micro control unit configured to control the module apparatus for garbage collection to operate in a low power mode based on the detected charge amount of the battery.

8. An operation method of a module apparatus for garbage collection which communicates with a server via a communication network and is attachable to a garbage receptacle, the method comprising:
attaching the module apparatus for garbage collection to a surface of the garbage receptacle via a coupling portion so that a first hole formed at the module apparatus for garbage collection is aligned with a second hole formed at the garbage receptacle;
sensing a volume of garbage accumulated in the garbage receptacle via the first hole and the second hole;
transmitting the sensed information to the server via a wireless communication network;
determining an initial signal strength by measuring strength of signals received from each of two or more base stations at an initial operation;
determining a signal strength variation from the initial signal strength by measuring the strength of the signals received from each of the two or more base stations after the initial operation; and
detecting, by the module apparatus for garbage collection, a location change of the module apparatus based on the determined variation.

9. The method of claim 8, the sensing of the volume of garbage comprises:
transmitting ultrasonic waves into the inside of the garbage receptacle, and measuring a first time taken for the ultrasonic waves to be reflected from an object and returned; and
calculating the height of the garbage based on the time.

10. The method of claim 9, wherein the sensing of the volume of garbage comprises:
determining a maximum reference value;
at the initial state before the garbage is accumulated in the garbage receptacle, measuring a minimum reference value based on an initial time taken for the ultrasonic waves to be reflected and received; and
calibrating the calculated height based on the minimum reference value and the maximum reference value.

11. The method of claim 8, further comprising receiving information, sensed by other module apparatus for garbage collection, from the other module apparatus for garbage collection, and transmitting the received information to the server.

* * * * *